United States Patent [19]

Mortensen

[11] 3,735,665

[45] May 29, 1973

[54] EXPANDABLE SCREW ANCHORING DEVICE AND A SPACING MEMBER THEREFOR

[76] Inventor: Louis Aackersberg Mortensen, Petersholm Hillerodvej 1, 3480 Fredensborg, Denmark

[22] Filed: Mar. 15, 1971

[21] Appl. No.: 124,097

[30] Foreign Application Priority Data

Mar. 16, 1970 Denmark..................................1298

[52] U.S. Cl..........................85/71, 24/73 P, 52/345, 52/573
[51] Int. Cl..............................................F16b 13/06
[58] Field of Search....................85/71, 70, 61, 62, 85/50 R, 84, 83, 82; 151/38; 52/573, 346, 345, 351, 717; 248/220.5, 206 R, 362, 363, 71; 24/73 PM, 73 P, 73 D

[56] References Cited

UNITED STATES PATENTS

| 3,342,000 | 9/1967 | Cripe | 24/73 P X |
| 2,324,142 | 7/1943 | Eklund | 85/70 X |
| 2,914,983 | 12/1959 | Kopf et al. | 85/71 |
| 2,918,841 | 12/1959 | Poupitch | 85/71 |
| 3,255,559 | 6/1966 | Gaeth et al. | 52/573 X |
| 3,340,761 | 9/1967 | Fischer | 85/71 |
| 3,534,797 | 10/1970 | Reinhard | 85/70 X |

Primary Examiner—Ramon S. Britts
Attorney—Robert E. Burns and Emmanuel J. Lobato

[57] ABSTRACT

An expandable screw anchoring device for fastening recessed or concavely shaped members, such as sectional iron members, to a wall or plate. The anchoring device comprises a spacing member to be positioned between the wall surface and the concavely shaped side of the member to be fastened, in order to prevent the anchoring device be partly drawn out of the bored hole in the wall when the screw cooperating with the anchoring device is tightened. According to the invention the spacing member is shaped in such a manner and/or made from such a material that it is axially deformable so that the length of the spacing member will automatically be adjusted to the "rise of arch" of the concavely shaped member when the screw is tightened. Thus, anchoring devices with spacing members having one and the same length may be used for fastening members having different "rise of arch."

4 Claims, 10 Drawing Figures

EXPANDABLE SCREW ANCHORING DEVICE AND A SPACING MEMBER THEREFOR

BACKGROUND OF THE INVENTION

1. Field of the Invention

The present invention relates to an expandable anchoring device for fastening a concavely shaped or recessed member to a plate or wall in abutting relationship with the concavely shaped or recessed side of said member facing said plate or wall, the anchoring device being mounted within a bored hole in said wall or plate and being expanded by the tightening of a srew, a bolt, or similar fastening means cooperating with the anchoring device and extending through an opening formed in a part of said concave or recessed member which is, in the fastened position of recessed member, in spaced relation to the adjacent plate or wall surface, said anchoring device comprising a substantially radially extending abutment surface for limiting the insertion of the anchoring device in the bored hole.

Typical examples of such anchoring devices to which the invention relates, are the various types of wall screw anchors or dowels as well as sleeves or sleeve-like parts used in connection with or constituting parts of the so-called expansion bolts. The anchoring devices may be with or without axial slits or slots and may be made from metal, plastics, or other suitable materials.

2. Description of the Prior Art

In the known anchoring devices of the above mentioned type the radially extending abutment surface is positioned close to one end of the anchoring device and has for its object to prevent that the anchoring device is pushed too deeply into the bored hole in which it is to be mounted, in order to secure that the end of the anchoring device adjacent to the abutment surface is fairly made flush with the outer surface of the material in which the hole is bored, for example the outer surface of a wall or a plate.

Quite often sectional iron or steel members having a substantially U-shaped cross-section are to be mounted on a wall, e.g. as supporting members for shelves, in such a manner that the free edges of the opposite flanges of said sectional iron members abut the wall surface, whereas the web of the sectional iron members is positioned in spaced relation to said surface. In such cases the necessary holes are marked out and bored in the wall in the usual manner, and anchoring devices are inserted in the holes with their abutment surfaces engaging the wall surface. Now, a sectional iron member is positioned on the wall, and screws are inserted through openings in the web of the sectional iron member and brought into engagement with the anchoring devices mounted in the bored holes. When the screws are tightened the heads thereof, or washers surrounding the screws, will abut the outer surface of the web.

The marking out and the boring of the holes in the wall must be performed very carefully. Otherwise, it will often be extremely difficult to bring all of the screws in a correct engagement with their corresponding anchoring devices mounted in the bored holes. Furthermore, when the screws having been brought into engagement with the anchoring devices are tightened said anchoring devices are normally partly drawn out of their bored holes till the outer ends of the anchoring devices abut the innerside of said web being spaced from the wall surface. Of course, the efficiency of the fastening devices is thereby substantially decreased due to the fact that a reduced portion of the length of the anchoring devices is expanded and anchored within the bored hole.

It should be understood that although sectional iron members have been mentioned by way of an example, the problems described above arise also in connection with the mounting of other recessed, dome-shaped, or concave members having screw openings in wall parts thereof which — in the mounted position of the recessed member on a wall surface — are positioned in spaced relation to said wall surface. Arched metal furnishings, cup-shaped members and channel iron are further examples of the recessed or concavely shaped members mentioned herein.

In the mounting of sectional iron members it has been attempted to prevent the above described drawing out of the anchoring devices by placing annular metal spacing members around the screws and between the innerside of the web of the sectional iron member and the wall surface on which said sectional member is to be mounted. However, this procedure has not found any widespread use, partly because these spacing members are very difficult to maintain positioned during the mounting procedure, and partly because the length of such metal spacing members must be closely adapted to the height or width of the flanges of the sectional iron member to be mounted.

It is also known to mount plate members or sectional members in a non-abutting relationship to and with a predetermined spacing from a plate or wall by using more or less deformable spacing members, and for the same object it is known to use anchoring devices each having a detachable, stiff spacing member at one end. When using these known anchoring devices, a plate-like member may be mounted in the desired spaced relation to a wall surface by attaching spacing members having a suitable length to the anchoring devices.

In case anchoring devices with the described detachable, stiff spacing members were used for mounting sectional iron members and the like arched members in order to avoid the disadvantages previously described the mounting of a certain sectional member would require the use of spacing members having a certain length. This situation would involve the possibility of using a distance member having an incorrect length, and furthermore necessitate the keeping in stock of a rather great number of different spacing members.

SUMMARY OF THE INVENTION

The object of the present invention is to provide an anchoring device of the type described and by means of which sectional iron members and other recessed or concavely shaped members having rather different rise of arch may be mounted without running the risk that the anchoring device is partly drawn out from the bored hole when the screw is tightened.

The anchoring device according to the invention comprises a spacing member extending axially and opposite to an abutment surface and being deformable in such a manner that the axial length thereof may be substantially reduced by the axially directed pressure being imparted to the spacing member when said fastening means is tightened.

According to another aspect of the invention a screw anchoring device has a radially extending abutment surface and a spacing member extending axially and opposite to said abutment surface, the axial length of the spacing member being substantially reducible by the compressive force imparted thereto by the tightening of a screw cooperating with the anchoring device.

In case the spacing member of the fastening device according to the invention is formed with a length corresponding to the greatest "rise of arch" for the sectional iron members (for the sake of simplicity "sectional iron members" will be mentioned as a representative example of all the recessed or concavely shaped members which may advantageously be mounted by means of the anchoring device according to the invention) for which the anchoring device is intended to be used the same anchoring device may be used for mounting a sectional iron member having a smaller rise of arch. When such member having a smaller rise of arch is to be mounted by means of the anchoring device according to the invention it is placed in such a manner that the inner side of the web of the sectional member engages the free ends of the spacing members of the anchoring devices which have been inserted in the bored holes in a wall or plate as described previously. Now the free edges of the flanges of the sectional member be spaced from the surface of the wall or plate. During the initial tightening of the screws, bolts, or fastening means cooperating with the anchoring devices these anchoring devices will be expanded within the bored holes and be efficiently anchored therein. During the continued tightening of the screw, rather high tensile forces are generated, and these forces will be opposed by corresponding axially directed compressive forces in the spacing members. When these compressive forces have attained a certain value, the deformable spacing member will be compressed axially till the length thereof has been reduced to such an extent that the flanges of the sectional member engage the wall surface in the manner desired. It is understood that according to this invention an anchoring device has been provided wherein one and the same spacing member may be used for mounting sectional iron members having a rise of arch within a relatively wide interval.

The deformability of the pacing member under the influence of the axially directed compressive forces may be obtained in rather different manners. As an example, the spacing member may be constituted by telescopic parts which may be displaced in relation to each other by overcoming a certain friction, or the spacing member may be made from a relatively soft, rubberlike material. Alternatively, according to the invention the spacing member may be tubular and comprise at least one circumferentially extending wall part having such a small thickness that said wall part will collapse or fold when said fastening means is tightened, for example like a concertina or a bellows. If desired, the circumferentially extending thin wall part may constitute the whole or substantially the whole spacing member extending from the abutment surface of the anchoring device.

In case the anchoring device is of the type having longitudinally extending helical slits or slots, the spacing device may alternatively, according to the invention, be formed integrally with the remaining part of the tubular anchoring member and have an outer diameter exceeding the outer diameter of said remaining part, said helical slits or slots continuing through the spacing member as channel-shaped grooves at the inner wall of the special member. During the production of the anchoring device the slits or slots may then be formed by corresponding ribs on a moulding core forming the inner space of the tubular anchoring device, and due to the fact that the slits continue through the spacing device the moulded anchoring device may easily be pulled from said core. In spite of the complex form of the slitted anchoring device the mould need not have more than two mould parts and may nevertheless be adapted to simultaneous moulding of several anchoring devices. The wall parts of the spacing member forming the bottoms of the channel-shaped grooves may constitute the axially deformable parts of the spacing member provided that they are given a suitable thickness, width and/or made from a suitable material.

BRIEF DESCRIPTION OF THE DRAWING

The invention will be further explained with reference to the drawing, wherein.

DESCRIPTION OF THE PREFERRED EMBODIMENTS

Figure 1:
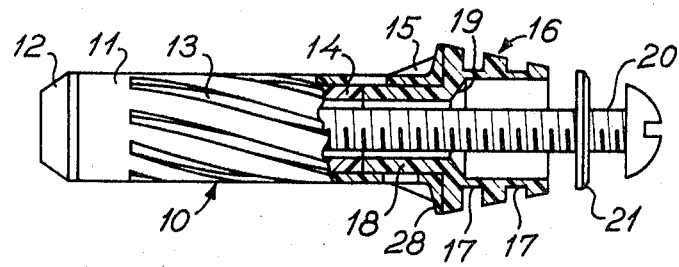
FIG. 1 illustrates a side view and partial sectional view of a first embodiment of the anchoring device according to the invention.

The anchoring devices 10 and 40 shown in FIGS. 1 – 5 and 8 – 10 are of the type comprising a screw 20 surrounded by a tube section or sleeve 14 of a deformable material, such as rubber or soft plastics material. The sleeve 14 is in turn surrounded by an anchoring member or body 11 or 44 which is preferably integrally moulded from plastics material, and a nut 12 for the screw 20 is positioned at one end of the anchoring member and is embedded therein or fastened thereto in any other manner. The wall of the anchoring member 11 and 44 is provided with a number of uniformly circumferentially spaced, helically extending slits or slots 13 dividing the wall into a number of strip or band-formed parts. At the end opposite to the nut 12 each anchoring member 11 and 44 is provided with a substantially radially extending abutment surface 28 formed by a flange or collar, and with knife-shaped axial ribs 15. The anchoring devices may also be provided with a washer 21 for the head of the screw 20, and a relatively stiff, tubular stiffening or distance member being indicated at 18 and 43 in FIGS. 1 and 8, respectively, is inserted into the end portion of the anchoring member provided with the ribs 15. These stiffening members prevent collapsing of the end portion of the anchoring member provided with the ribs, when this end portion is pushed into a bored hole in a wall.

All of the anchoring members or anchoring bodies shown in the drawings are provided with tubular distance or spacing members 16, 26, 31, 41, and 50, respectively. In the embodiments shown in FIGS. 1 – 3, 4 and 5, and 9 and 10, the distance member is formed integrally with the stiffening member 18 and may therefore, if desired, readily be replaced by a stiffening member without a spacing member. In the embodiments shown in FIGS. 6 and 7 and in FIG. 8 the distance member is formed integrally with the anchoring member 30 and 40, respectively.

Figure 2:
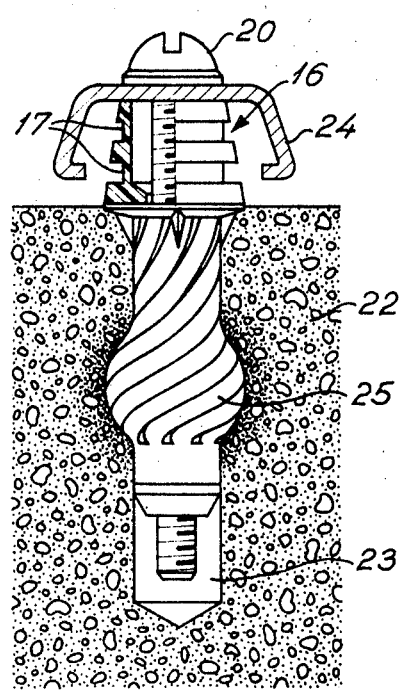
FIG. 2 is a partial sectional view of a sectional iron member which is being mounted on a wall by means of the anchoring device shown in FIG. 1, FIG. 3 corresponds to FIG. 2, but the mounting of the sectional iron member has now been completed, FIGS. 4 and 5 correspond to FIGS. 2 and 3, but show a second embodiment of the anchoring device according to the invention, FIGS. 6 and 7 correspond to FIGS. 2 and 3, but illustrate the use of a third embodiment of the anchoring device according to the invention.
Figure 3:
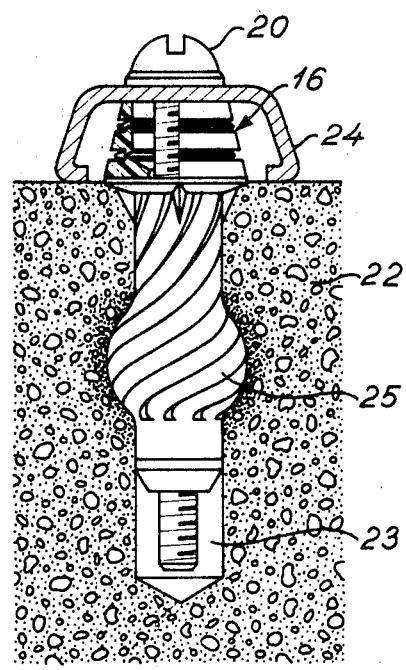

The anchoring devices described are primarily intended to be used for mounting recessed or concavely shaped members, such as sectional iron members, channel iron or the like arched elements, on a wall or another surface in abutting relationship therewith, but in such a manner that in the mounted position the head of the screw 20 will engage a portion of the mounted member being spaced from said wall or surface. A sectional view of an example of a recessed or concavely shaped member or element is shown in FIGS. 2 and 3. The element shown is a sectional rail 24 of the type being used for mounting shelves. The rail 24 comprises two oppositely positioned flanges and a web having a number of holes (not shown) for screws. When such a rail 24 is to be mounted on a wall 22 the holes in the web of the rail are marked up on the wall, and holes 23 are bored in the wall at the marked-up positions. Anchoring devices 10 are now inserted in the bored holes 23 in such a manner that the abutment surface 28 engages the wall surface, and the distance member 16 projects from the wall surface as shown in FIG. 2. The rail 24 is then positioned on the projecting spacing members 16 as shown and in such a manner that the holes in the web of the rail are substantially aligned with the tubular spacing members. A screw 20 is now inserted through each of the holes in the web and is brought into threaded engagement with the nut 12 of the aligned anchoring device. In case the width of the flanges of the rail 24 is smaller than the axially projecting length of the spacing member 16 the rail 24 including the flanges thereof will be spaced from the wall surface as shown in FIG. 2. The screws 20 may now be tightened, for example by means of a screw driver, a certain axial pressure directed towards the wall being simultaneously exerted on the screw. Tightening of the screw results in that the inner end of the anchoring member 11 is forced in an outward direction and simultaneously subjected to a twisting action. However, the axially inwardly directed pressure exerted on the screw 20 during tightening the same is transmitted to the anchoring member 11 through the rail 24 and the spacing member 16, which prevents the anchoring member from being drawn out of the bored hole 23. Therefore, tightening of the screw 20 only results in that a bulge 25 is formed on the anchoring member 11 (FIGS. 2 and 3) whereby the anchoring member is anchored in the wall material. It should be noted that the length of the stiffening member 18 may define the position at which the bulging takes place along the length of the anchoring member.

A pair of circumferentially extending annular grooves or channels are formed in the spacing member 16 whereby collapsible or foldable annular wall parts 17 are defined. When the anchoring member 11 has been fastened or anchored in the wall 22 as shown in FIG. 2 by tightening the screw, further tightening of the screw generates an increased stress in the same, and therefore the spacing member 16 positioned between the abutment surface 28 and the inner side of the web of the rail 24 will be subjected to correspondingly increased compressive forces. When these compressive forces have attained a certain value the collapsible wall parts 17 will collapse as a bellows (FIG. 3), whereby the axial length of the spacing member will be reduced. This reduction of the length of the spacing member will continue till the free edges of the flanges of the rail 24 come into engagement with the adjacent wall surface. A further tightening of the screw 24 will now only result in a further expansion of the anchoring device within the bored hole and in a tighter engagement between the rail 24 and the wall surface.

It may be difficult to mark out and bore the holes in the wall 22 with such an accuracy that all of the holes in the web of the rail 24 may be positioned in complete alignment with the anchoring devices inserted in the bored holes. However, due to the fact that the free end of the spacing member 16 abuts the inner side of the web of the rail 24, the end of the screw 20 may rather easily be led into the anchoring member, even if the holes in the rail 24 and the corresponding anchoring devices are not completely aligned. However, in such case the insertion of the screw 20 may be further facilitated by shaping the inner surface of the spacing member 16 as a funnel 19 (FIG. 1).

Figure 4:
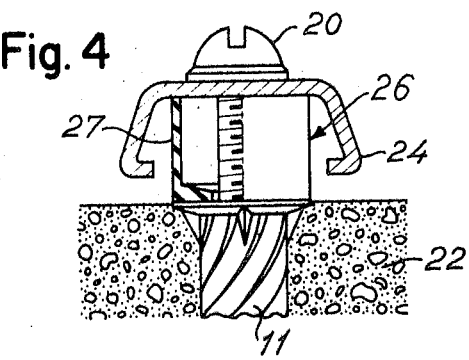
Figure 5:
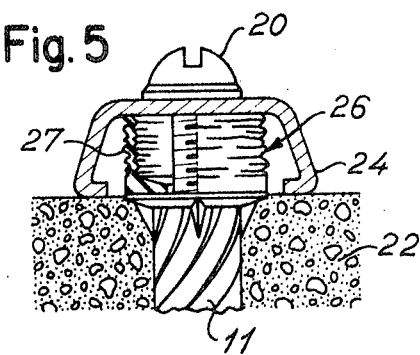

In the embodiment shown in FIGS. 4 and 5 the spacing member 26 comprises a relatively thin cylindrical wall 27 having a thickness adjusted in relation to the flexibility or deformability of the material, so that the wall 27 will collapse axially as indicated in FIG. 5 when the screw 20 is sufficiently tightened. Apart from the modified embodiment of the spacing member the anchoring devices shown in FIGS. 4 and 5 may correspond completely to those shown in FIGS. 2 and 3.

Figure 6:
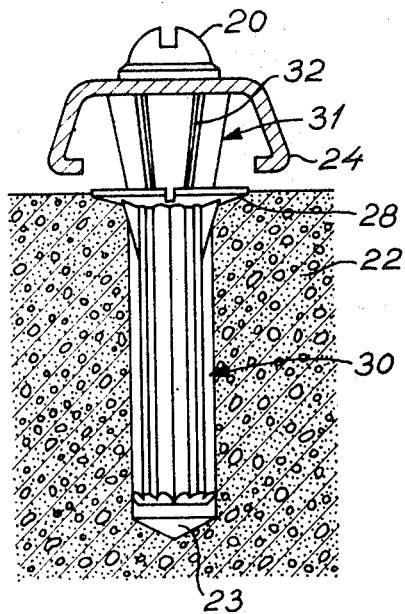
Figure 7:
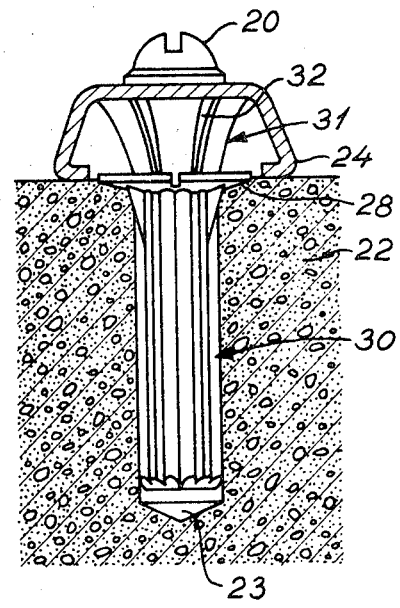

FIGS. 6 and 7 show a dowel or wall plug 30 of the tubular type having longitudinally extending corrugations and a substantially uniform cross section along its length. The spacing member 31 defines a conical tubular part divided up by longitudinally extending slits or slots 32. When the screw 20 (normally being a wooden screw) is tightened, the fingers defined between the slits 32 will be bend as shown in FIG. 7, till the flanges of the rail 24 engages the adjacent surface of the wall 22.

Figure 8:
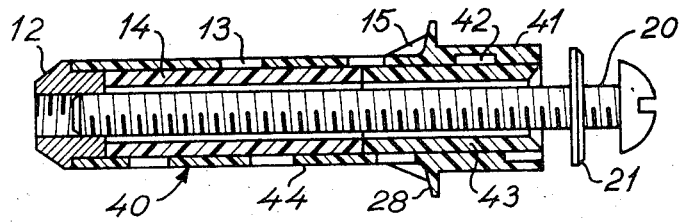
FIG. 8 is a longitudinal sectional view of a fourth embodiment of the anchoring device according to the invention, and FIGS. 9 and 10 correspond to FIGS. 2 and 3, but illustrate the use of a fifth embodiment of the anchoring device according to the invention.

The anchoring device shown in FIG. 8 corresponds to that shown in FIG. 1 apart from the fact that in FIG. 8 the spacing member 41 is formed integrally with the anchoring member, and the helical slits or slots 13 in the anchoring member continue along the inner side of the spacing member 41 as channel-shaped grooves 42. In case the grooves 42 are suitable dimensioned and the spacing member is made from a suitable material the bottom parts of the grooves 42 will collapse in a similar manner as the wall parts 17 in FIG. 1, when the screw 20 is tightened.

Figure 9:
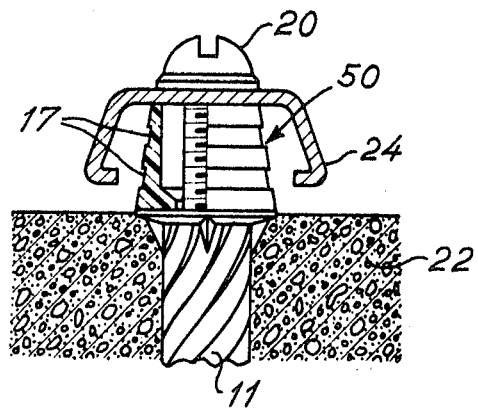
Figure 10:
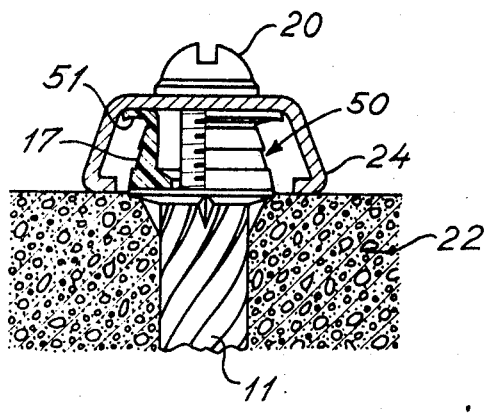

FIGS. 9 and 10 show a further embodiment 50 of a spacing member having in this case a conical, tapered shape. The spacing member 50 is preferably made from a material having almost the same deformability as hard rubber, and the spacing member 50 comprises, just like the embodiment shown in FIGS. 1 – 3, circumferentially extending wall parts 17. The thickness of these wall parts is, however, not substantially reduced. When the screw 20 is tightened the free edge portion of the spacing member 50 will be bended outwardly as shown in FIG. 10.

In order that the spacing member of the anchoring device according to the invention may be able to function in a satisfactory manner it must — by a suitable choice of material and/or shape — be adapted so that the spacing member is not compressed substantially axially before the screw has been tightened sufficiently to secure anchoring of the anchoring device to such an extent that the anchoring device is not partly pulled out from the bored hole when the screw is further tightened.

Furthermore, it should be understood that the principles of the invention may also be used in connection with anchoring devices of other types than those herein described. The described embodiments should be considered representative examples of anchoring devices comprised by the present invention.

Although the spacing member of the anchoring device according to the invention is preferably made from plastics material, it may alternatively be made from any other suitable material, such as metal or rubber.

What is claimed is:

1. An expandable anchoring device for fastening a recessed member to a wall with the recessed side of said member facing the wall, said anchoring device comprising: anchoring means insertable into a hole formed in the wall during use of the device and including an elongated deformable portion radial expandable into engagement with the surface portion of the wall which defines said hole in response to axial compression of said portion for anchoring said device to the wall; fastening means extendable through said recessed member and cooperative with said anchoring means to axially compress said deformable portion and radially expand the latter within said hole when said fastening means is tightened to fasten said recessed member to the wall with the recessed side thereof facing the wall; abutment means connected to said anchoring means for abutting with the wall to limit the extent of insertion of said anchoring means into said hole; and a spacing member replaceably inserted through said abutment means into the interior of said anchoring means and engageable with the inside surface of said recessed member to position said recessed member relative to the wall and to prevent said anchoring means from being drawn out of the hole when said fastening means is tightened to expand said anchoring means.

2. An expandable anchoring device according to claim 1, wherein said abutment means and said spacing member are totally contained within the recess of said recessed member such that said spacing member and said abutment means fill in the gap adjacent said fastening means between the inside surface of said recessed member and the surface of the or wall.

3. An expandable anchoring device according to claim 1, wherein said abutment means and spacing means comprise a one-piece integral unit.

4. An anchoring device according to claim 1, wherein said anchoring means comprises a tubular anchoring member having means in one part defining longitudinally extending helical slits, said spacing member being formed integrally with the remaining part of the tubular anchoring member and having an outer diameter exceeding the outer diameter of said remaining part, said helical slits or slots continuing through the spacing member as channel-shaped grooves at the inner wall of the spacing member.

* * * * *